US009774149B2

(12) United States Patent
Janfada et al.

(10) Patent No.: US 9,774,149 B2
(45) **Date of Patent: *Sep. 26, 2017**

(54) MAGNETICALLY ACTUATED AC POWER CONNECTOR

(71) Applicants: Arash Janfada, Maple Ridge (CA); William Topping, Prince Albert (CA)

(72) Inventors: Arash Janfada, Maple Ridge (CA); William Topping, Prince Albert (CA)

(73) Assignees: Arash Janfada, Maple Ridge, BC; William Topping, Saskatoon (SK)

( * ) Notice: Subject to any disclaimer, the term of this patent is extended or adjusted under 35 U.S.C. 154(b) by 0 days.

This patent is subject to a terminal disclaimer.

(21) Appl. No.: 14/979,478

(22) Filed: Dec. 27, 2015

(65) Prior Publication Data

US 2016/0336695 A1 Nov. 17, 2016

Related U.S. Application Data

(63) Continuation of application No. 13/859,677, filed on Apr. 9, 2013, now Pat. No. 9,225,126.

(Continued)

(51) Int. Cl.

*H01R 11/30* (2006.01)
*H01R 13/703* (2006.01)

(Continued)

(52) U.S. Cl.

CPC ....... *H01R 13/7037* (2013.01); *H01R 13/629* (2013.01); *H01R 24/78* (2013.01); *H01R 2103/00* (2013.01)

(58) Field of Classification Search

CPC ........................ H01R 13/6205; H01R 13/7037

(Continued)

(56) References Cited

U.S. PATENT DOCUMENTS 2,573,920 A * 11/1951 McLeod ................ H01H 36/00 174/53
3,144,527 A * 8/1964 Tolegian .................. H01J 5/54 200/51.09

(Continued)

OTHER PUBLICATIONS

USPTO, Office Action for U.S. Appl. No. 13/859,677 dated Oct. 27, 2014.

(Continued)

*Primary Examiner* — Neil Abrams
(74) *Attorney, Agent, or Firm* — Norton Rose Fulbright Canada LLP; Niall Cooney

(57) ABSTRACT

An apparatus for electrically connecting a power source to an electrical device is disclosed. The apparatus has a first component and a second component. The first component has a first face having a ferromagnetic plate, a first set of contacts electrically connectable to a power source, two power switches and a magnetically actuated sensor controlling the switches. The second component has a second face complementary to the first face having a magnet and a second set of electrically conductive contacts electrically connectable to the electrical device. Connecting the first and second faces, results in the first and second pair of contacts electrically coupling and establishes an electrical path between the power source and the device, and connects the components by magnetic attractive force which actuates the power switches and initiates power to the device. The apparatus further has a safety circuit for preventing electric shock.

19 Claims, 6 Drawing Sheets

Related U.S. Application Data

(60) Provisional application No. 61/640,002, filed on Apr. 30, 2012.

(51) Int. Cl.
*H01R 24/78* (2011.01)
*H01R 13/629* (2006.01)
*H01R 103/00* (2006.01)

(58) Field of Classification Search
USPC ................................ 439/39, 188; 200/51.09
See application file for complete search history.

(56) References Cited

U.S. PATENT DOCUMENTS

| | | | |
|---|---|---|---|
| 3,521,216 | A | 7/1970 | Tolegian |
| 4,317,969 | A | 3/1982 | Riegler et al. |
| 4,451,113 | A | 5/1984 | Zuniga |
| 4,647,120 | A | 3/1987 | Karabakakis |
| 4,874,316 | A | 10/1989 | Kamon et al. |
| 5,567,175 | A | 10/1996 | Warden et al. |
| 5,954,520 | A | 9/1999 | Schmidt |
| 6,528,746 | B2 | 3/2003 | DeWitt et al. |
| 6,561,815 | B1 | 5/2003 | Schmidt |
| 6,966,781 | B1 | 11/2005 | Bullinger et al. |
| 7,056,127 | B2 | 6/2006 | Suzuki et al. |
| 7,097,461 | B2 * | 8/2006 | Neidlein ............ H01R 13/6205 439/39 |
| 7,311,526 | B2 | 12/2007 | Rohrbach et al. |
| 7,736,033 | B2 | 6/2010 | Patel |
| 7,775,801 | B2 | 8/2010 | Shiff et al. |
| 8,439,178 | B2 * | 5/2013 | Kuehl ....................... F16D 1/10 192/30 W |
| 8,596,881 | B2 * | 12/2013 | Umeno ................ G02B 6/3817 385/53 |
| 8,651,876 | B2 | 2/2014 | Mysliwiec et al. |
| 9,225,126 | B2 * | 12/2015 | Janfada .............. H01R 13/7037 |
| 9,318,886 | B1 * | 4/2016 | Pate ....................... H01R 11/30 |
| 2009/0309542 | A1 | 12/2009 | Hung et al. |
| 2014/0176071 | A1 | 6/2014 | Alammari |

OTHER PUBLICATIONS

USPTO, Office Action for U.S. Appl. No. 13/859,677 dated May 27, 2015.

* cited by examiner

MAGNETICALLY ACTUATED AC POWER CONNECTOR

CROSS-REFERENCE TO RELATED APPLICATIONS

This application is a continuation of U.S. patent application Ser. No. 13/859,677, filed on Apr. 9, 2013, issued as U.S. Pat. No. 9,225,126 B2, which claims the benefit of U.S. Provisional Application No. 61/640,002 electronically filed on Apr. 30, 2012 and given EFS ID 12656459 and Confirmation Number 1024.

BACKGROUND OF THE INVENTION

Field of the Invention

This invention relates to a power connector and, in particular, a power connector without probes for electrical connection.

Description of Related Art

Conventional power connectors comprise of a male plug component having contact prongs extending outwards for inserting into a corresponding receiving member in a female plug component or a socket, where the receiving member holds the prongs in place and the male and female plug components are electrically connected using frictional force. In some situations, for example in very low temperatures, the insertion and removal of the prongs becomes difficult and may cause damage to the cord and devices connect to the cord.

U.S. Pat. No. 7,311,526 disclosed a magnetic connector that connects a direct current (DC) power supply to a device. Such connector has safety issues if used for transmitting high voltage alternative current (AC) signal, as electric shock may occur when the user touches electrically live high voltage exposed contacts. Therefore an improved power connector design is desired to accommodate high voltage AC electric power supplies. Other power connector systems that may share common design features with the current system are shown in the following patents:

U.S. Pat. No. 7,621,753 Pai
U.S. Pat. No. 7,874,844 Fitts
U.S. Pat. No. 7,442,042 Lewis
U.S. Pat. No. 6,739,915 Hyland
U.S. Pat. No. 7,339,205 McNeely
U.S. Pat. No. 6,770,986 Nagao
U.S. Pat. No. 5,584,715 Ehrenfels
U.S. Pat. No. 4,748,343 Engel
U.S. Pat. No. 7,351,066 DiFonzo
U.S. Pat. No. 7,517,222 Rohrbach
U.S. Pat. No. 7,645,143 Rohrbach

BRIEF SUMMARY OF THE INVENTION

In the light of the foregoing background, it is an object of the present invention to provide an alternate power connector.

Accordingly, the present invention, in one aspect, is an apparatus for electrically connecting a power source to an electrical device. The apparatus comprises a first component and a second component. The first component has a substantially planar contoured first face, and the first face comprises, in part, a set of 3 electrical pad contacts, one for each: hot, neutral, and ground connected to the power source. The second component has a substantially planar contoured second face complementary to the first face, and the second face comprises, in part, a set of 3 electrical pad contacts, one for each: hot, neutral, and ground connected to the electrical device. The first set of contacts becomes electrically coupled to the second set of contacts upon connecting the first face with the second face, thereby establishing a first (primary) electrical path between the power source and the electronic device.

In an exemplary embodiment of the present invention, the power source may be any standard household AC supply outlet and the primary electrical path is an AC supply path between the outlet and the electronic device. The first plug component further comprises power rectifier circuitry which branches off from the primary path and supplies DC power via a secondary electrical path to internal power switching circuitry.

In a another exemplary embodiment, the power connector further comprises at least one electrically operated switch and one actuating sensor. The switch is initially in the off position and is disposed in the primary electrical path. The actuating member is disposed in the secondary electrical path. When the first and second faces are attached, the actuating sensor is triggered by the presence of the magnet and closes the switch located in the first electrical path resulting in power conduction to the electronic device.

In another exemplary embodiment of the present invention, the male plug face comprises a ferromagnetic element and the female plug face comprises a magnetic element. The primary electrical path is established upon connecting the male plug face comprising of a ferromagnetic element, to the female plug face comprising a magnetic element, whereby the presence of the magnet on the female plug face triggers the actuating sensor inside the male plug component and closes the switch disposed in the primary electrical path and results in power conduction. In addition to actuating power conduction, the attractive force between the ferromagnetic and magnetic plates, on the male and female faces respectively, binds the plug components together allowing the electrical coupling between the pad contacts to be maintained during plug operation.

There are many advantages to the present invention. First of all, the male plug component and the female plug component (i.e. the first component and the second component) are held together by non-frictional forces such as magnetic forces, and the contact face between the components is substantially planar and contoured. Attaching the components is simply completed by contacting the male plug face with the female plug face. Separating the components requires minimal pulling force and as a result will not cause any damage to the components in low temperatures due to excessive friction force caused by variable temperature induced contraction of components. The performance of the substantially planar contoured contact face is not affected by contraction and expansion due to changes in ambient temperature. As a result, the force required to separate the plug components is also independent of ambient temperature.

The strength of the magnetic force is chosen to be removable with deliberate force but is considerably less than the maximum connective force of other connections, such that in situations where the device is pulled from the power supply with excessive force, the magnetic coupling between the male plug component and the female plug component of the power cord is always first to break, preventing damage to the device and the power supply. An example of such situation is in engine block heaters in vehicles where the user may drive a vehicle away from its parked position without noticing that the block heater cord is connected to a wall socket via an extension cord, a common practice used to keep the engine warm enough to be started in cold climates.

Another advantage of the present invention is that the circuit is designed to prevent the electrical contacts from being live with AC power when the male plug component is connected to the power source but not to the female plug. In the absence of the safety shut off mechanism, a user would suffer electric shock upon touching an electrically live contact. Using an electrically operated switching mechanism as a part of the circuit ensures that the power transmission components are only actuated when the male plug face is in contact with the female plug face, which in the case of the present invention means that the contacts are accurately connected between the corresponding male and female plug components.

Another advantage of the present invention is that the power connector has no moving parts and the surface of contact is substantially planar and contoured, therefore debris such as dust, dirt or ice will not easily collect on the components and potentially affect the operation of the connector such as shorting the circuit, especially so if the power connector is to be usable in outdoor environments. Where debris does collect on the contact surfaces, the surfaces can be readily wiped clean due to their substantially planer nature.

An additional advantage of the present invention is that the electrical contacts located on the male plug face will be slightly recessed below the contact surface of the ferromagnetic plate located on the contact face. This is primarily a safety feature which further reduces the chance of electric shock if a metal object is accidentally lodged between the male and female plug face when they are connected and the system is actuated to the on-position by the presence of the magnet.

BRIEF DESCRIPTION OF THE SEVERAL VIES OF THE DRAWINGS

Figure 4A:
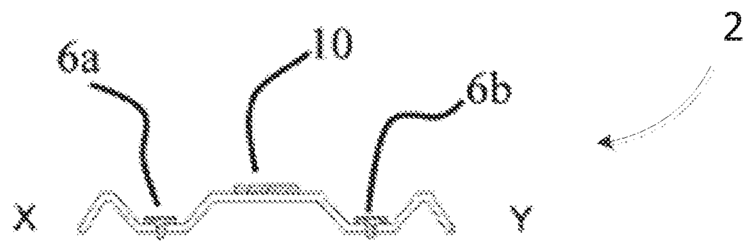

FIG. 4*a* is a cutaway cross-section (X-Y) of the contoured male plug face according to an embodiment of the present invention.

Figure 4B:
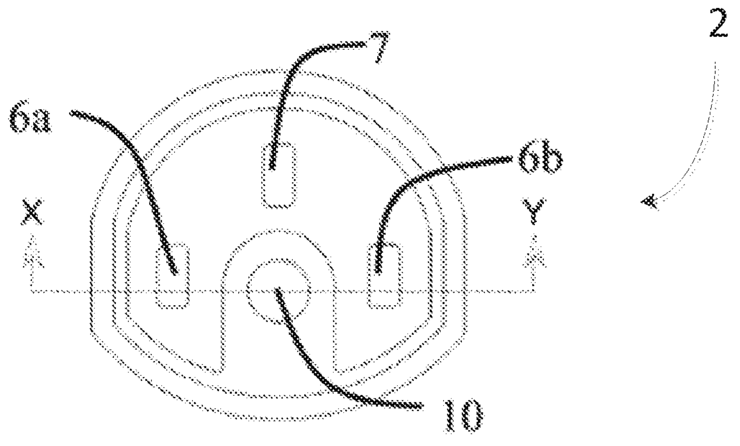

FIG. 4*b* is a front view of the male plug face showing the location of cross-section (X-Y) according to an embodiment of the present invention.

Figure 5A:
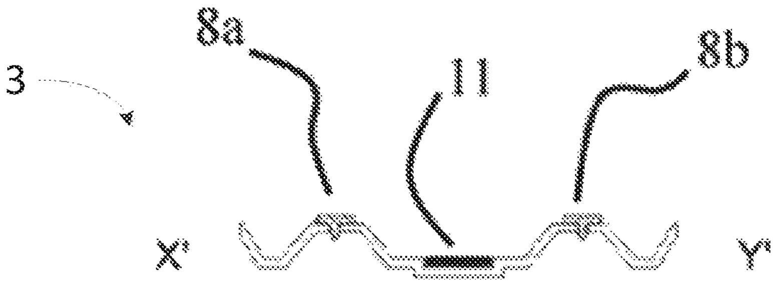

FIG. 5*a* is a cutaway cross-section (X'-Y') of the contoured female plug face according to an embodiment of the present invention.

Figure 5B:
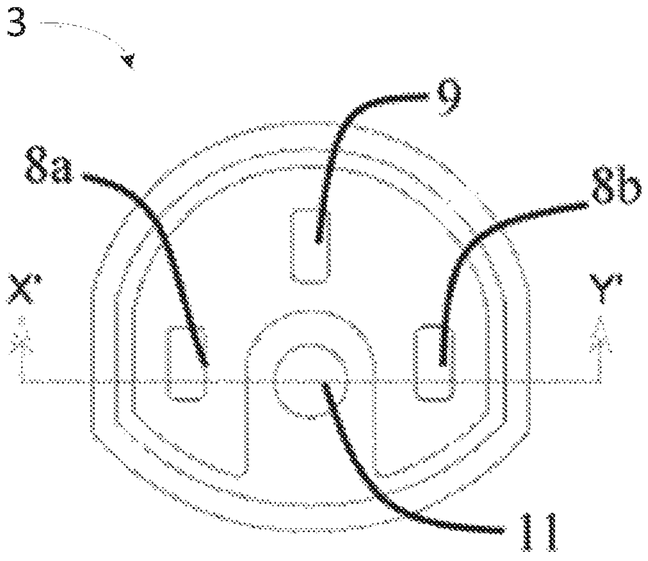

FIG. 5*b* is a front view of the female plug face showing the location of cross-section (X'-Y') according to an embodiment of the present invention.

Figure 6:
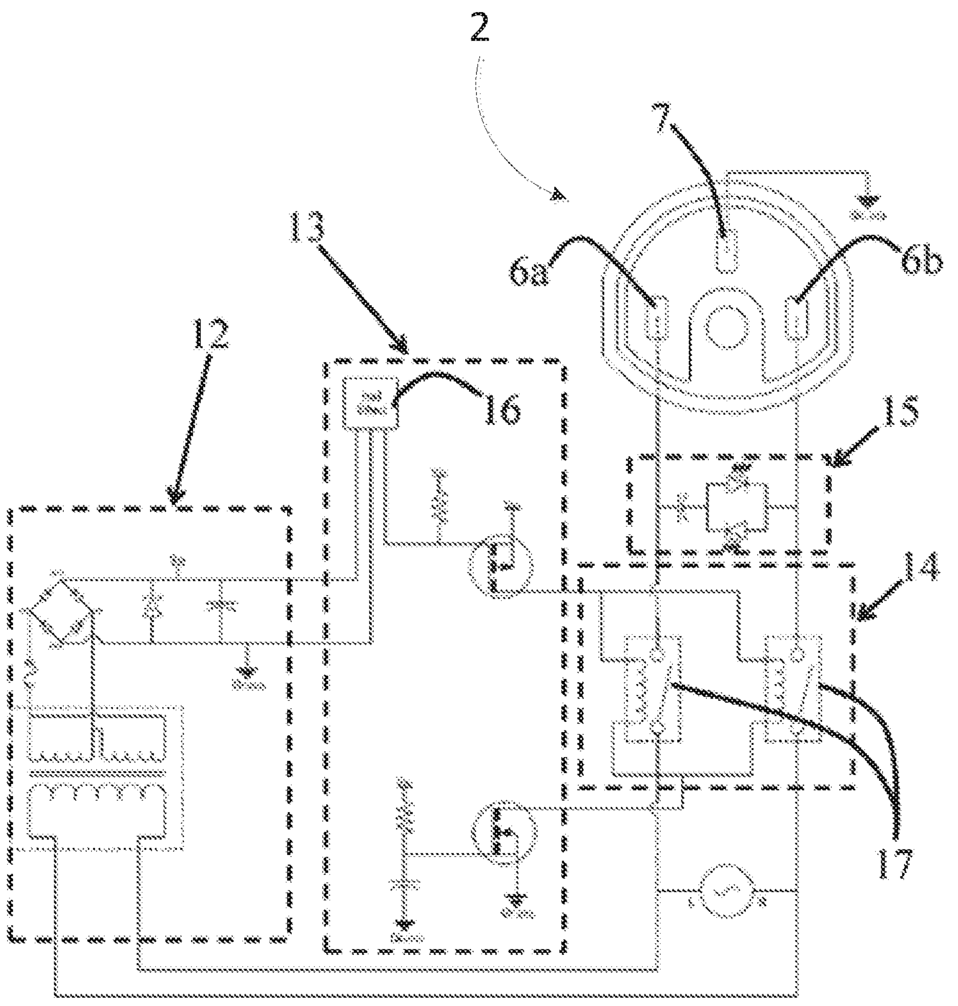

FIG. 6 is a complete circuit diagram of the power connector circuitry of the male plug component according to an embodiment of the present invention.

Figure 7:
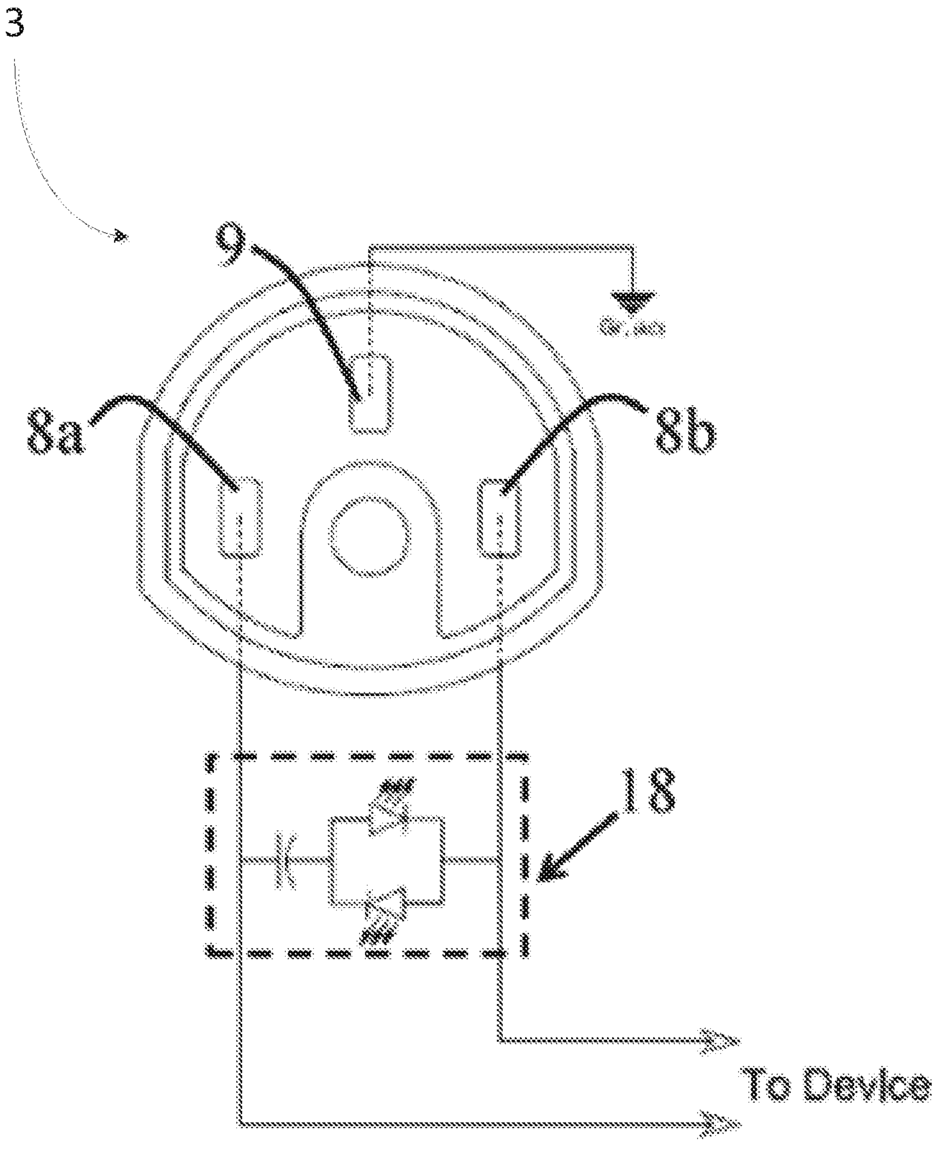

FIG. 7 is a complete circuit diagram of the power connector circuitry of the female plug component according to an embodiment of the present invention.

DETAILED DESCRIPTION OF THE INVENTION

As used herein and in the claims, "comprising" means including the following elements but not excluding others.

As used herein and in the claims, "couple" or "connect" refers to electrical coupling or connection either directly or indirectly via one or more electrical means unless otherwise stated.

Figure 1:
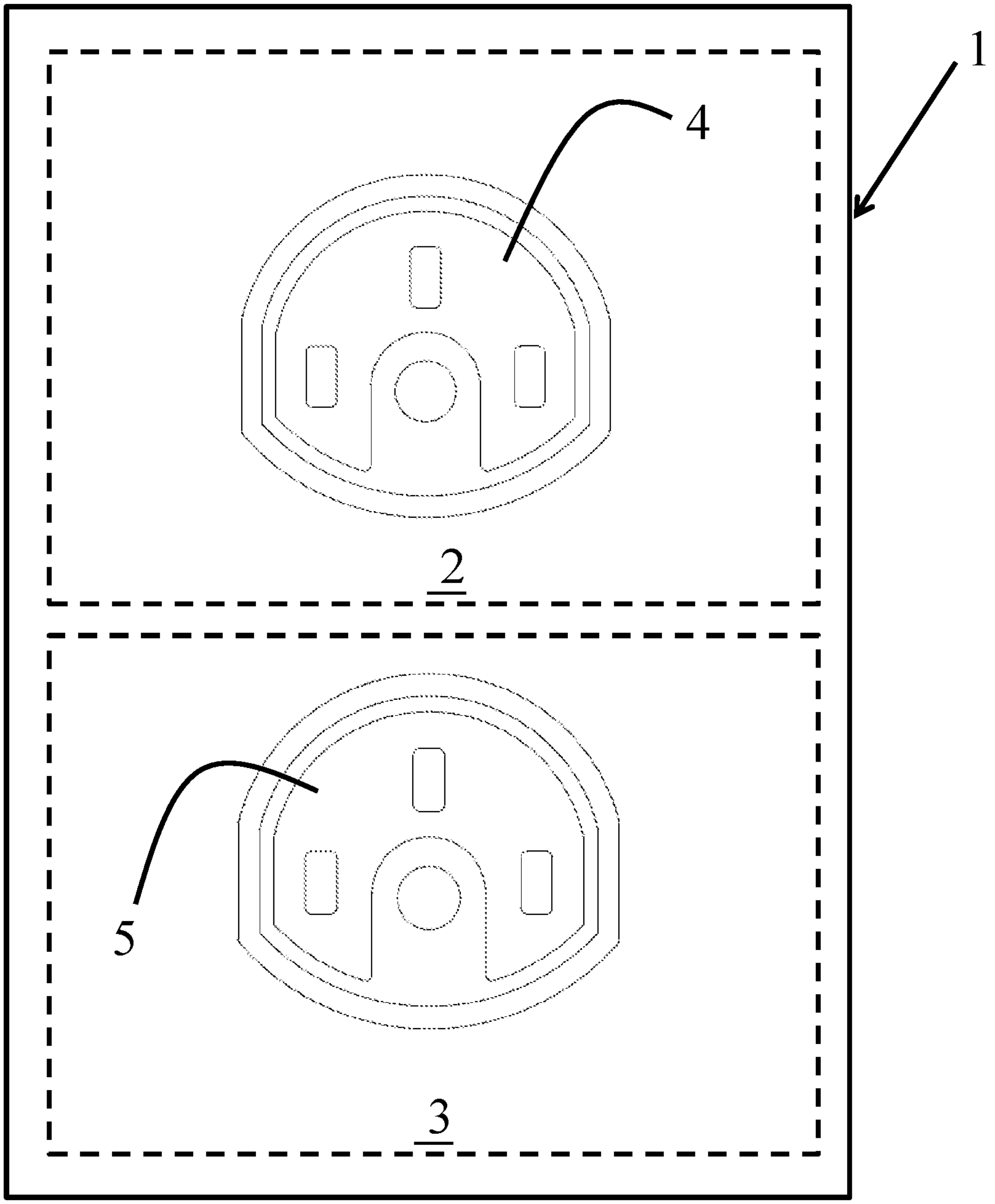
FIG. 1 is a block diagram of the power connector male and female faces according to an embodiment of the present invention.
Figure 2:
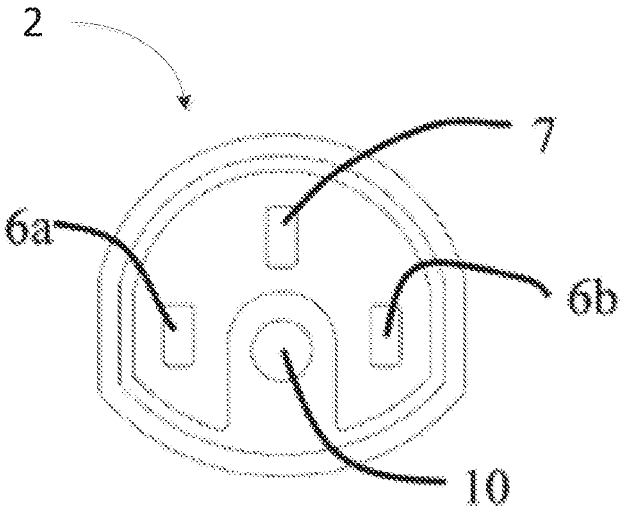
FIG. 2 is a front view of a male plug face according to an embodiment of the present invention.
Figure 3:
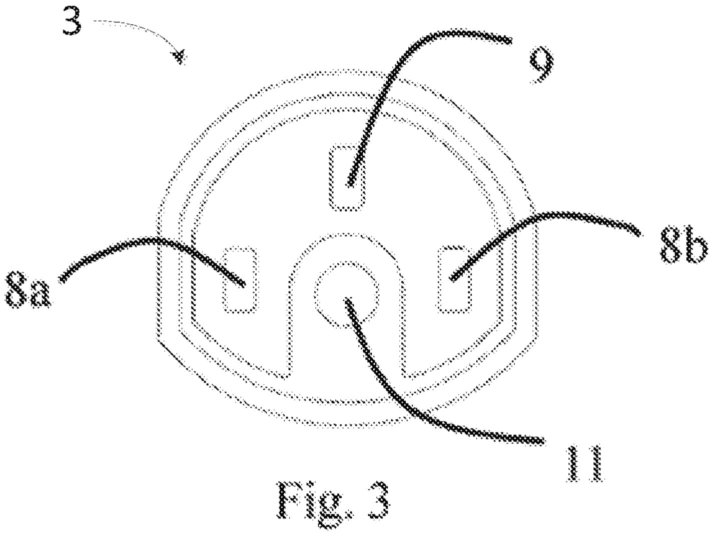
FIG. 3 is a front view of a female plug face according to an embodiment of the present invention.

Referring now to FIGS. 1, 2 and 3, the first embodiment of the present invention is a power connector 1 comprising a male plug component 2 and a female plug component 3. The male plug component 2 has a standard male power supply connector at the rear (not shown) adapted to connect to a power supply such as a wall socket. The female plug component 3 has a standard female connector at the rear (not shown) adapted to connect to an external electrical device to be powered. The male plug component 2 further comprises a male plug face 4 which is substantially planar and contoured, and the female plug component 3 further comprises a female plug face 5 which is also substantially planar and contoured. There is at least one set of contacts on the male plug face 4. In the specific example as shown in FIG. 2, there are three (3) electrical pad contacts, one for each: hot, neutral, and ground denoted by 6*a*, 6*b* and 7 respectively. There is also at least one set of contacts on the female plug face 3. In the specific example as shown in FIG. 3, there are three (3) electrical pad contacts, one for each: hot, neutral, and ground, denoted by 8*a*, 8*b* and 9 respectively. The contour of the male plug face 2 and the female plug face 3 are complementary to each other such that the entire male plug face 2 can be contacted to the female plug face 3.

In operation of the power connector 1, the male plug component 2 is brought into contact with the female plug component 3. The entire male plug face 4 is in contact with the female plug face 5 due to their substantially planer and complementary construction. When the two faces are in contact, the first set of three contacts 6*a*, 6*b* and 7 are electrically coupled to the corresponding second set of three contacts, 8*a*, 8*b* and 9. This completes the electrical path between the power supply and the electrical device. As a result, electric power can flow from the power supply to the electrical device.

In an exemplary embodiment, referring to FIG. 2 and FIG. 3, one ferromagnetic element 10 is disposed on the male plug face 4, and at least one magnetic element 11 is disposed on the female plug face 5. The ferromagnetic element 10 and the magnetic element 11 become connected through magnetic attractive force when the male plug face 4 is brought into contact with the female plug face 5, thus attaching the male plug component 2 to the female plug component 3 and vice versa. In a further embodiment, the ferromagnetic element 10 and the magnetic element 11 are installed at predetermined locations in the male plug component 2 and the female plug component 3 respectively, such that the male plug component 2 can only be attached to the female plug component 3 in a predetermined orientation, where the predetermined orientation ensures the electrical path to be established in a safe manner and isolates the individual electrical pad contacts located on each of the plug faces.

Magnetic elements generate magnetic fields. When one magnetic element 10 is brought into proximity of a ferromagnetic element 11, a magnetic attractive force is generated between the two elements. The magnetic force acts substantially along the axis of the magnetic element. As such, in the present invention, when the male plug face 4 is brought into proximity of the female plug face 5, a magnetic attractive force is generated perpendicular to the male plug face 4 and the female plug face 5 causing them to attach. The magnetic force prevents the components from detaching once connected unless sufficient external force is applied to detach the components.

In another exemplary embodiment, FIG. 4*a* and FIG. 4*b* show cross-section cutaways of the male plug face 4, and FIG. 5*a* and FIG. 5*b* show cross-section cutaways for the female plug face 5. The cross-sections show the substantially planer and complementary contoured design of the plug faces. The electrical contacts on the male plug face 4 are 6*a*, 6*b* and 7 and are recessed within the contoured folds of the male and plug. Since the electrical pad contacts (6*a*, 6*b* and 7), on the male plug face 4 have to potential to be live when the system is actuated, this recessed design ensures additional safety and creates asymmetrical contours on the substantially planer face which ensure that the male plug face 4 and female plug face 5 only connect in one specific orientation.

In an exemplary embodiment, the magnetic element 11 is a permanent magnet, made of neodymium-iron-boron or samarium cobalt type disc or ring magnet. The magnetic force generated will be calibrated to be strong enough to prevent unintentional detachment but not too strong for possible damage to other parts, such as the power supply cable or the electrical device, before the connector components can be detached either accidentally or intentionally. Preferably, a force between approximately 3 lbs to 5 lbs should be produced between the magnetic and ferromagnetic elements.

In another exemplary embodiment, a disc-type magnet has a diameter of 0.375 inch or 0.5 inch and a thickness ranging from 0.1 inch to 0.125 inch. In yet another exemplary embodiment, a ring-type magnet has an outer diameter of 0.375 inch to 0.5 inch, an inner diameter of 0.125 inch and a thickness ranging from 0.1 inch to 0.125 inch.

In an exemplary embodiment, an electric circuit is provided to control the establishment of the electrical path. Referring to FIG. 6, three circuit component-groups are disposed in the male plug component 2 each of which perform a separate function while working together to activate the plug system. The AC/DC power supply component-group 12 converts conventional household power (120 volt AC) into a low-voltage direct current (DC) supply. The AC/DC power supply component-group 12 is connected to the 120 volt AC power source (house power plug) on one end and on the other end is connected to the sensor and switching component-group 13. The sensor and switching component-group 13 performs the function of detecting the presence of a magnetic field. As shown in FIG. 6, this component-group is connected to the AC/DC power source component-group 12 at one end, and on the other is connected to the power transmission component-group 14. The power transmission is attached to a standard residential power supply at one end, and to the hot and neutral contacts (6*a*, 6*b*) on the male plug face 4 on the other. A final component group is place between the power transmission component-group and the contacts 6*a* and 6*b* on the male plug face 4. This is the indicator light component group 15 which consists of two light-emitting-diodes (LED) in parallel, and a capacitor in series with the LEDs. The indicator light component group informs the plug system operator that the relays are engaged and that power is being transmitted by the system.

Referring to FIGS. 2, 3 and 6, at least one electronic sensor and one electrically operated switch is disposed in the male plug component 2. In a specific embodiment as shown in FIG. 6, one hall-effect switch 16 is disposed inside the male plug component 2, and two power relay type switches 17 are disposed inside the male plug component 2. The system is powered on when the hall-effect sensor 16 in the male plug component 2 senses the presence of a magnetic field from the magnet disposed on the female plug face 5. When the male plug component 2 and female plug component 3 are connected, they attach by magnetic attraction force between the magnet 11 disposed on the female plug face 5 and the ferromagnetic plate 10 disposed on the male plug face 4. Simultaneous with the connection of the plug components, the hall-effect sensor 16 detects the presence of the magnetic field and begins to provide current to the coil of the power relay switches 17. This triggers the relays into the "on" position where they begin to conduct AC power to the attached electric device. The relay power output terminals are electrically connected to contacts 6*a* and 6*b* disposed on the male plug face 4.

In a further exemplary embodiment, with reference to FIG. 1, FIG. 6 and FIG. 7, when the male plug component 2 and female plug component 3 are attached, contacts 6*a*, 6*b* and 7 disposed on the male plug face 4 are in direct contact with contacts 8*a*, 8*b* and 9 disposed on the female face. In turn, the electric device is connected via the female plug component 3 to contacts 8*a* and 8*b* internally (FIG. 7). As a result, power is transferred to the electronic device. When the user detaches the male plug component 2 from the female plug component 3, the magnet 13 and associated magnetic field is also removed from the vicinity of the Hall-Effect sensor 16 causing the Hall-Effect sensor to terminate current transfer to the coils of the relays. This causes the relays to return to the "off" position and stop the transition of power to contacts 6*a* and 6*b* making the system electronically inactive.

In an exemplary embodiment, the AC/DC conversion circuit is a transformer-based conversion circuit that outputs a 6V DC voltage.

In one embodiment, with reference to FIG. 7, an indicator circuit 19 is provided within the female plug component 3 electrically parallel to the device connecting wires of the female component 3 to alert the user when electric power is supplied to the electrical device. In an exemplary embodiment, the indicator 19 is a visual indicator light emitting diode (LED) circuit.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the casing or external housing of the male 2 and female 3 plug components can be constructed of any rigid synthetic, semi-synthetic or organic composite polymeric material such as polyvinyl chloride, and can be constructed in any shape conductive to the adapted use, so long as the design parameters and functional constrains previously described are maintained.

In another example, a gasket can be provided surrounding the male plug face 6 and the female plug face 7. The gaskets then push against each other when the male plug face 2 is in contact with the female plug face 3, preventing external particles such as dust or ice to enter, causing damage to the power connector system.

In yet another example, the actuating element may be spring loaded piston within the male plug component upon which live electrical contacts are mounted. Once the male and female plug components are connected, the piston is drawn forward and electrically coupled with contacts on the female component thus transmitting power to a connected electronic device.

An AC/DC conversion circuit with transformer-less or capacitative elements can be used in place of a transformer conversion circuit with the same function. A transformerless conversion circuit generally occupies less space.

It is obvious to one skilled in the art that the plug faces can be contoured in a way to improve alignment of the components, as long as an axial frictional force is not created during attachment. The construction and assembly of the embodiments previously described is accomplished through conventional means and uses conventional components and therefore should be consistent with the common general knowledge of a person skilled in the art.

The invention claimed is:

1. An apparatus comprising:
- a first component comprising:
  - a first set of electrical contacts;
  - a ferromagnetic element; and
  - a first face having the first set of electrical contacts and the ferromagnetic element disposed thereon;
- a second component comprising:
  - a second set of electrical contacts;
  - a magnetic element producing a magnetic field; and
  - a second face having the second set of electrical contacts and the magnetic element disposed thereon;
- a sensor; and
- a switching element for enabling a flow of current;
- wherein coupling the first component with the second component causes the first set of electrical contacts to form an electrical connection with the second set of electrical contacts;
- wherein coupling the first component with the second component generates an attractive force between the ferromagnetic element and the magnetic element; and
- wherein the sensor, responsive to detecting the magnetic field, is configured to cause the switching element to enable current to flow between the first set of electrical contacts and the second set of electrical contacts.

2. The apparatus of claim 1, wherein the ferromagnetic element is located substantially at the center of the first face.

3. The apparatus of claim 1, wherein the magnetic element is located substantially at the center of the second face.

4. The apparatus of claim 1, wherein the first set of electrical contacts and the second set of electrical contacts each comprise three electrical contacts.

5. The apparatus of claim 4, wherein each of the first and second sets of electrical contacts comprise hot, neutral and ground contacts.

6. The apparatus of claim 1, wherein the first face comprises a protruding portion having the ferromagnetic element disposed thereon, and wherein the second face comprises a recessed portion for accepting the protruding portion, the recessed portion having the magnetic element disposed thereon.

7. The apparatus of claim 6, wherein the first set of electrical contacts are disposed on a portion of the first face other than the protruding portion.

8. The apparatus of claim 6, wherein the second set of electrical contacts are disposed on a portion of the second face other than the recessed portion.

9. The apparatus of claim 1, wherein the first component is connected to a power source and the second component is connected to an electrical device, and wherein coupling the protruding portion to the recessed portion establishes an electrical path between the power source and the electrical device.

10. The apparatus of claim 1, wherein a surface of the first face and a surface of the second face have complementary shapes.

11. The apparatus of claim 1, wherein the first component and the second component can only be coupled in a predetermined orientation.

12. The apparatus of claim 1, wherein the attractive force has a magnitude of about 3 to 5 pounds.

13. The apparatus of claim 1, further comprising at least one light emitting diode, wherein the at least one light emitting diode is illuminated when the switching element is enabling the current flow.

14. The apparatus of claim 1, wherein the sensor is a Hall-effect sensor.

15. The apparatus of claim 1, wherein the switching element is a relay switch.

16. The apparatus of claim 1, further comprising a gasket configured to seal an interface between the first face and the second face when the first component and the second component are coupled.

17. A method comprising:
- providing a first component, the first component comprising:
  - a first set of electrical contacts;
  - a ferromagnetic element; and
  - a first face having the first set of electrical contacts and the ferromagnetic element disposed thereon;
- providing a second component, the second component comprising:
  - a second set of electrical contacts;
  - a magnetic element producing a magnetic field; and
  - a second face having the second set of electrical contacts and the magnetic element disposed thereon;
- coupling the first component with the second component to:
  - generate an attractive force between the ferromagnetic element and the magnetic element; and
  - form an electrical connection between the first set of electrical contacts and the second set of electrical contacts;
- detecting, by a sensor, the magnetic field; and
- responsive to the sensor detecting the magnetic field, causing, by the sensor, a switching element to enable current to flow between the first set of electrical contacts and the second set of electrical contacts.

18. The method of claim 17, wherein the switching element has a default configuration preventing current from flowing, and wherein enabling current to flow comprises triggering the switching element to a configuration allowing current to flow.

19. The method of claim 18, wherein a surface of the first face of the first component and a surface of the second face of the second component have complementary shapes.

* * * * *